United States Patent
Eskicioglu et al.

(10) Patent No.: US 7,254,236 B1
(45) Date of Patent: Aug. 7, 2007

(54) METHOD AND SYSTEM FOR HANDLING TWO CA SYSTEMS IN A SAME RECEIVER

(75) Inventors: Ahmet Mursit Eskicioglu, Staten Island, NY (US); Michael Scott Deiss, Zionsville, IN (US); Jean-Louis Diascorn, Carmel, IN (US); David Jay Duffield, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 649 days.

(21) Appl. No.: 10/089,902

(22) PCT Filed: Oct. 6, 2000

(86) PCT No.: PCT/US00/27685

§ 371 (c)(1),
(2), (4) Date: Apr. 3, 2002

(87) PCT Pub. No.: WO01/26372

PCT Pub. Date: Apr. 12, 2001

Related U.S. Application Data

(60) Provisional application No. 60/157,968, filed on Oct. 6, 1999.

(51) Int. Cl.
*H04N 7/167* (2006.01)
(52) U.S. Cl. ..................... 380/239; 380/242
(58) Field of Classification Search .......... 380/239, 380/241, 242
See application file for complete search history.

(56) References Cited

U.S. PATENT DOCUMENTS 5,420,866 A * 5/1995 Wasilewski .......... 370/426
6,178,242 B1 * 1/2001 Tsuria .................. 380/201
6,307,939 B1 * 10/2001 Vigarie ................. 380/210
6,738,905 B1 * 5/2004 Kravitz et al. ......... 713/194
2002/0044658 A1 * 4/2002 Wasilewski et al. .... 380/239
2002/0094084 A1 * 7/2002 Wasilewski et al. .... 380/241

FOREIGN PATENT DOCUMENTS

EP     0858184     8/1998

(Continued)

OTHER PUBLICATIONS

Functional Model Of A Conditional Access☐☐Systen/, Ezu Revieh-☐☐☐☐Technical, BE, European broadcasting union, Functional Model of a Conditional Access, 1995, Brussels, Nr. 266, pp. 64-77, XP 000559450, IssN: 0251-0936 the whole document.*

(Continued)

*Primary Examiner*—Nasser Moazzami
*Assistant Examiner*—Eleni Shiferaw
(74) *Attorney, Agent, or Firm*—Joseph J. Laks; Robert D. Shedd; Paul P. Kiel

(57) ABSTRACT

A method for enabling a security device to access a service protected by a conditional access system, wherein the service has associated with it two conditional access (CA) system identifier pairs. The device extracts the two CA identifier pairs and automatically identifies the pairs based on a predefined convention, for example, the order in which the identifier pairs are sent. The identifier pairs may comprise a conditional access entitlement control message identifier and a local entitlement control message identifier.

19 Claims, 3 Drawing Sheets

FOREIGN PATENT DOCUMENTS

WO          00/56068          9/2000
WO          WO 0056068    *  9/2000

OTHER PUBLICATIONS

D. Kramer: "Wunderksite Des Digitalen Fernsehens" Bulletin Sev/ VES, Schweizerischer Elektrotechnischer Verein, vol. 88, NR. 3, pp. 27-30 (Translation attached).*

"Functional Model Of A Conditional Access System", ebu Review-Technical, European Broadcasting Union, pp. 64-77.

D. Kramer: "Wunderkiste Des Digitalen Fernsehens" Bulletin Sev/ VSE, Schweizerischer Elektrotechnischer Verein, vol. 88, NR. 3, pp. 27-30 (Translation attached).

* cited by examiner

METHOD AND SYSTEM FOR HANDLING TWO CA SYSTEMS IN A SAME RECEIVER

This application claims the benefit under 35 U.S.C. § 365 of International Application PCT/US00/27685, filed Oct. 6, 2000, which was published in accordance with PCT Article 21(2) on Apr. 12, 2001 in English; and which claims benefit of U.S. provisional application Ser. No. 60/157,968 filed Oct. 6, 1999.

FIELD OF THE INVENTION

The present invention relates generally to digital audio/video transmission systems, and more particularly to a method and system which allows a receiver in a digital audio/video transmission system to use multiple conditional access identifications.

BACKGROUND OF THE INVENTION

ISO/IEC 13818-1 is an international standard that specifies the coding of one or more elementary streams of audio and video as well as other data into single or multiple streams suitable for storage and transmission. Two forms of coding are recommended: Program Stream (PS) coding and Transport Stream (TS) coding. In the coding process, Audio-Visual (A/V) streams are first compressed and packetized to obtain Packetized Elementary Streams (PES). The PS combines one or more streams of PES packets with a common time base into a single stream. The TS combines one or more programs with one or more independent time bases into a single stream. PS packets may be of variable length, and TS packets are 188 bytes in length. Each TS packet has a 4-byte header with a packet ID (PID) that identifies the type of data contained in the packet. In addition to PES packets, a TS contains Program Specific Information (PSI) tables to demultiplex and present programs. A Program Map Table (PMT) is a table that provides the mappings between the program numbers and the elements that comprise them. It includes a list of PIDs associated with each program.

The Advanced Television Systems Committee (ATSC) has adopted the Simulcrypt architecture for its Conditional Access (CA) system for terrestrial broadcast. In this architecture, each service is transmitted with Entitlement Management Messages (EMMs) and Entitlement Control Messages (ECMs) for a number of different proprietary systems. This way, decoders using different CA systems can decode the service using a common framework for signaling the different entitlement messages. Each service is comprised of audio and video packets. Any one decoder picks out the packets it needs and ignores the others in the stream.

In a Simulcrypt based CA system, a digital audio/video processing system, such as a Digital Television (DTV) parses the PMT and extracts the service and ECM PIDs using a CA system identification (ID) obtained from the CA module. Normally, each CA module supports only one CA system, and therefore has only one CA system ID. The PIDs of the A/V packets and the PIDs of the ECMs carrying the Control Words (CWs) are sent to the CA module, which descrambles programs having proper purchase entitlements.

U.S. Pat. No. 5,420,866 to Wasilewski describes a method for providing conditional access information to a plurality of different decoders which is very similar to a Simulcrypt system. Wasilewski describes using a CA system identification parameter CA_System_ID to identify the different CA providers, and hence the different decoders (see col. 12, lines 12-16).

Additionally, an article entitled "Wunderkiste des digitalen Fernsehens" by Daniel Kramer mentions the Simulcrypt technique (Kramer D: "Wunderkiste des digitalen Fernsehens", Bull. SEV/VSE, CH, Schweizerischer Elektrotechnischer Verein, Zurich, Vol. 88, No. 3, pp. 27-30).

SUMMARY OF INVENTION

The present invention permits an audio/video processing device to use two CA system IDs to parse the PMT, and the CA module to correctly identify the ECM PIDs which belong to a particular CA system. It includes a method for an A/V processing device, for example a DTV, to enable a security device to access a program by correctly identifying the packets for service and entitlement control messages. The security device is associated with the A/V processing device, which in turn is associated with a digital transmission system for data associated with a service. The method comprises extracting at least one service and entitlement message control packet identifier pair from the data and, if only one service and entitlement control message packet identifier pair is extracted, identifying the extracted pair; and, if more than one service and entitlement control message packet identifier pair is extracted, automatically selecting one of the extracted pairs according to a predefined convention.

DETAILED DESCRIPTION OF THE INVENTION

Figure 1:
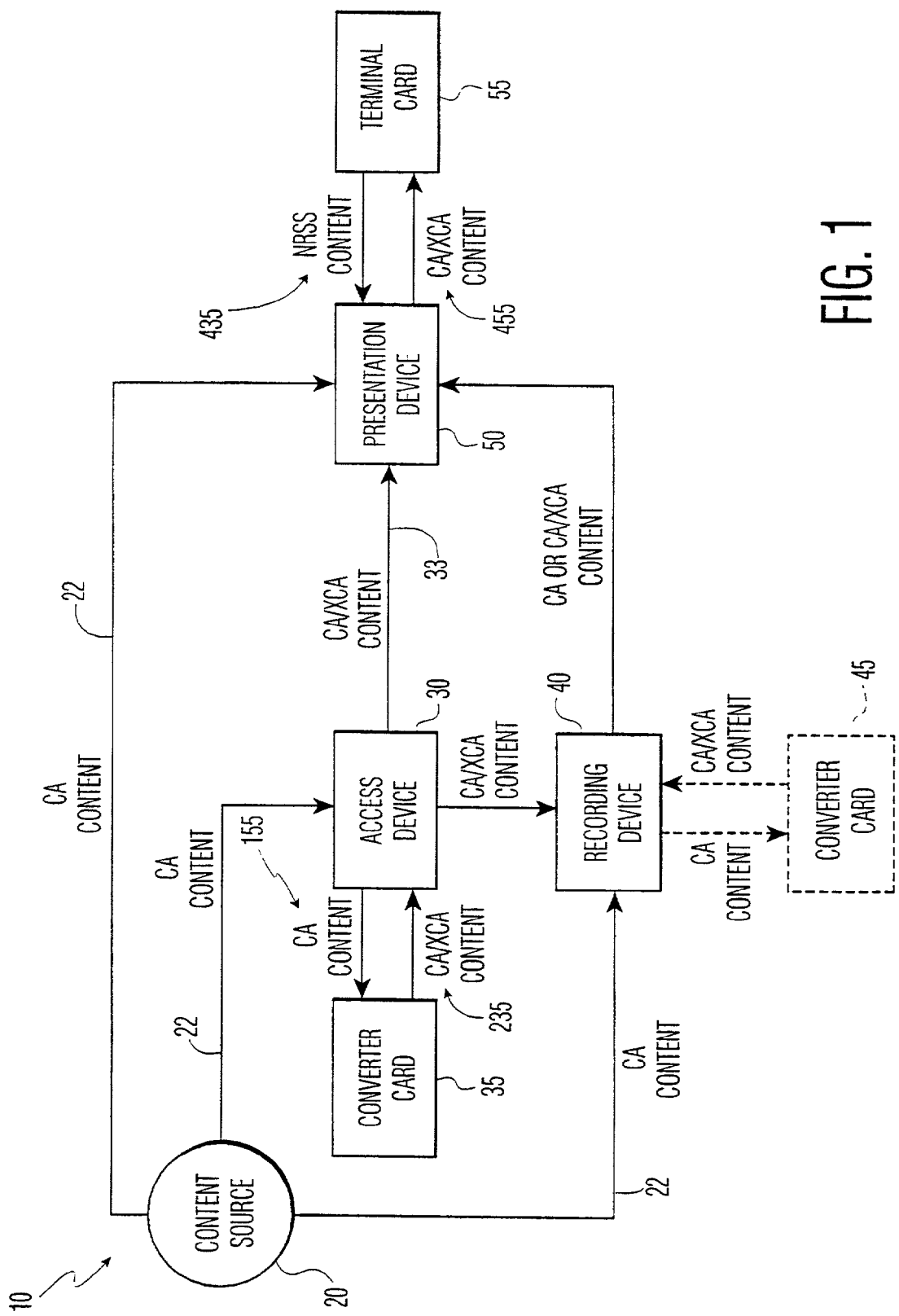
FIG. 1 illustrates a network adapted to receive content from a broadcasting source and provide copy protection using XCA and the NRSS copy protection system.

FIG. 1 illustrates a network 10 that receives content from a broadcasting source, i.e. via content source 20, and provides protection with XCA and the NRSS copy protection system (described below). The content source 20 can provide the CA content 22 of economic value, whether from tape, DVD, cable, satellite or terrestrial broadcast, for example. The content 22 typically includes A/V content, which is protected and supplied to subscribers of a private CA network. The subscribers who purchase, or are otherwise entitled to receive the content 22, are supplied with necessary keys for descrambling the content 22. According to the embodiment of FIG. 1, the content source 20 can provide this CA content 22 to an access device 30, recording device 40 or presentation device 50.

Access device 30 can take the form of a set-top box. The set-top box 30 operates in conjunction with an XCA/NRSS converter card 35 to create XCA protected content from the CA content 22 which becomes part of the CA/XCA content 33. Recording device 40 can take the form of a Digital VHS (DVHS) or DVD recorder. The recording device may or may not be provided with a converter card 45 analogous to the converter card 35. Presentation device 50 can take the form of a DTV, and operate in conjunction with an XCA/NRSS terminal card 55 for descrambling CA/XCA protected content.

Extended Conditional Access (XCA) is a system for protecting MPEG2 encoded digital A/V content during transmission and storage while supporting established and new models for content distribution and sales. XCA accomplishes this task by mapping the basic controls of "playback" and "record" into viewing control. Under the XCA system, content of economic value is always scrambled, i.e., is either under the control and responsibility of the distributor or within the confines of the consumers home, e.g. local, network. XCA allows recording of scrambled content, but only legitimate copies may be descrambled and viewed. Since non-legitimate content is not descrambled, it cannot be viewed. Non-legitimate content is that which is not an original or otherwise authorized by the copyright owner, for example.

XCA provides three levels of entitlements. Content that is free to distribute in unlimited fashion is "free-copy" content. Examples of this content may be broadcast television, infomercials or similar material that is advertised or supported. "Copy-once" or local view programming content can be created and viewed in a single household or local network regardless of time. However, such a copy cannot be transported to other local networks. Examples of this type of content may be sporting events or premium services. Finally, "never-copy" or immediate view programming content allows for only real-time viewing, i.e., recorded copies are not viewable. Examples of this type of content may be pay-per-view programming or other high-value content.

A distinct characteristic of the XCA architecture is the notion of conditional access and local protection. Local protection, or security, is the protection of content within the boundaries of a home network, after an access device, e.g. 30, receives the scrambled program, e.g. CA content 22. It specifies what a presentation device e.g. 50, has access to, and can thus convert and display protected content. Removable security devices, e.g., converter and terminal cards 35, 45, 55, perform security related functions. Content of economic value is delivered using a CA service. For example, digital satellite systems scramble video content and keys for mass distribution to their subscribers. Some subscribers may decide to purchase the content in which case they are supplied with the necessary keys for descrambling the content and viewing. Those subscribers choosing not to purchase the content are not provided access to these keys. In XCA, the descrambling keys are rebundled in a new ECM, which is protected by a unique local public key. The presentation device that receives content with local ECMs (LECMs) therefore needs to handle not only the content protected by a particular CA system, but by XCA as well.

Figure 2:
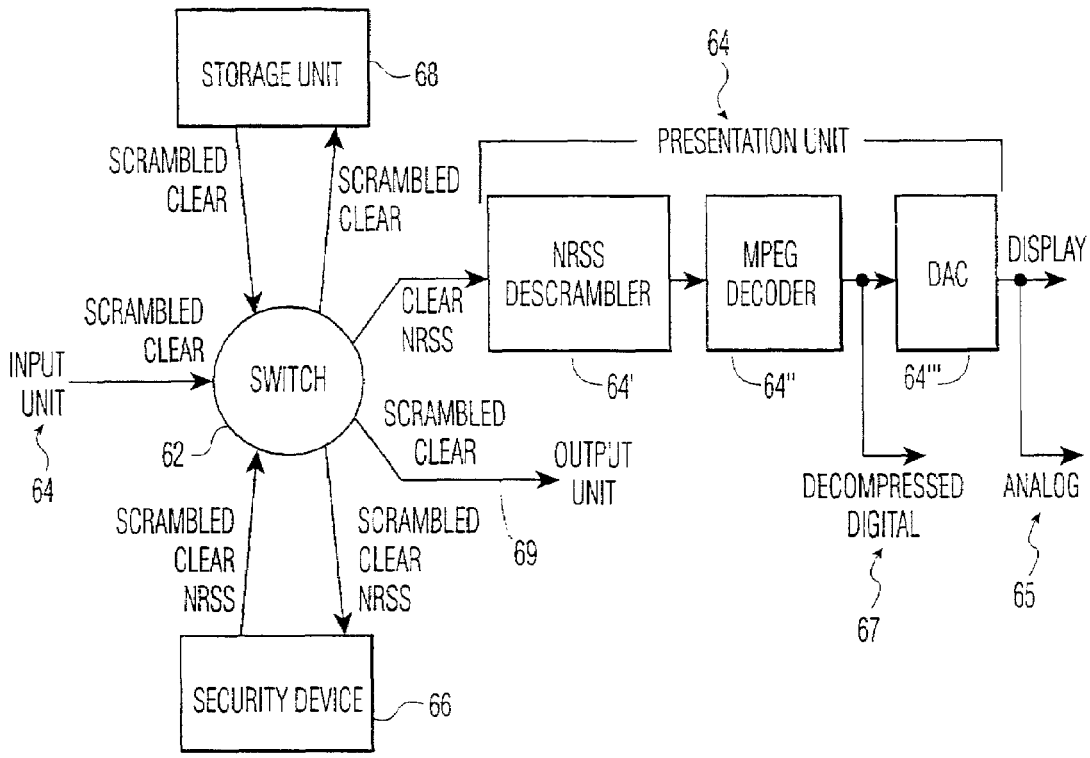
FIG. 2 illustrates a block diagram of an XCA device employed within the system of FIG. 1.

Referring now also to FIG. 2, a generic XCA Consumer Electronics (CE) device 60 suitable for use in system 10 is illustrated therein. Certain types of device 60 have specific functionality. For example, the XCA access device 30 creates XCA protected content for CA/XCA 33, the XCA presentation device 50 descrambles XCA protected content, and the XCA recording device 40 stores and plays but cannot create or descramble XCA protected content unless it is provided with the converter card 45. Generally, the generic device 60 includes a switching unit 62, input unit 61 and a renewable or embedded security device 66, e.g. converter card 35 or 45, or terminal card 55. Depending on what type of device it is, the device 60 may also include a presentation unit 64, storage unit 68, analog output 65, decompressed digital output 67 or compressed digital output 69.

Figure 3:
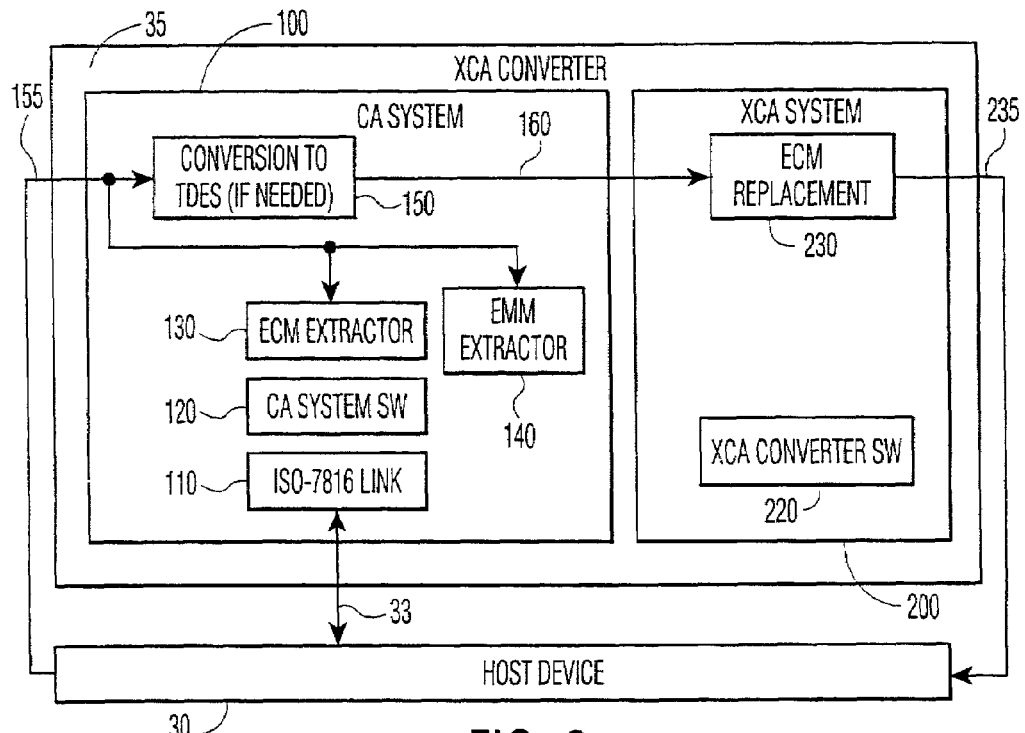
FIG. 3 illustrates a block diagram of a converter card utilized according to an aspect of the present invention; and, FIG. 4 illustrates a block diagram of a terminal card utilized according to an aspect of the present invention.
Figure 4:
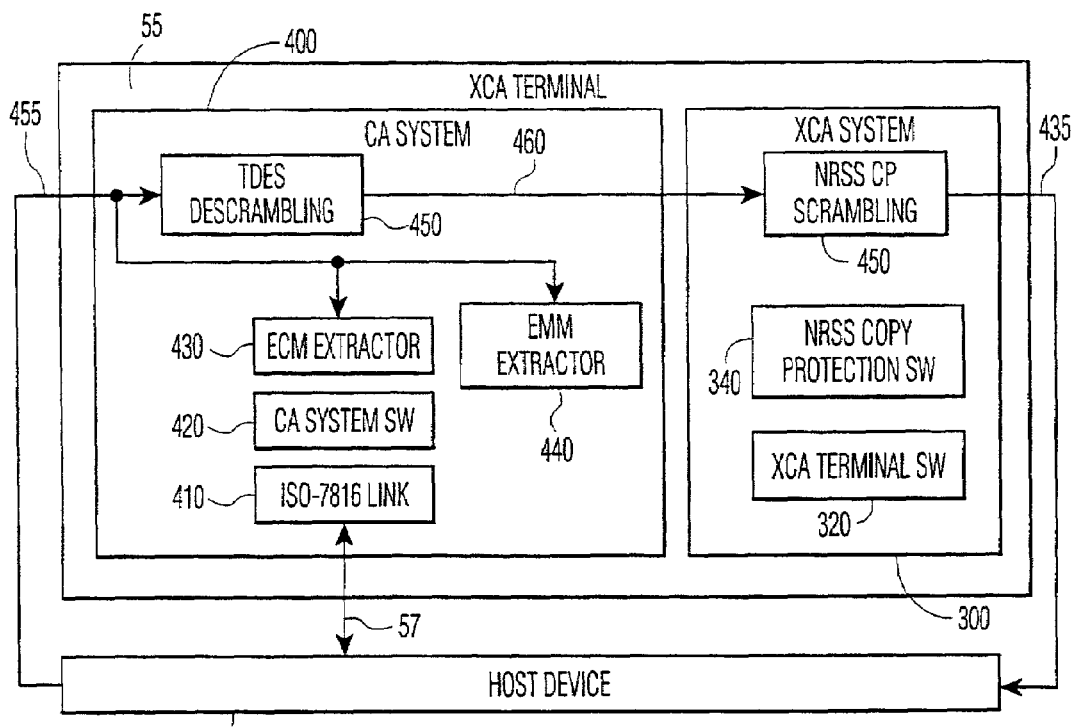

The digital input unit 61 generally comprises circuitry and software needed to acquire a digital signal, for instance a demodulator. The compressed digital output 69 uses circuitry and software to issue an MPEG2 digital signal, for instance a modulator. Security device 66 handles CA functions and XCA functions, and is able to transform the type of the content. It is the only element of the model that outputs in digital format a transformed content. As set forth, the security device 66 may take the form of the converter card 35 or 45, or terminal card 55. The converter cards 35 and 45 support functionality such as (i) checking CA entitlements; (ii) control word (CW) recovery; and (iii) content descrambling. It generates the Triple Data Encryption Standard (TDES) keys, re-scrambles the content, and encrypts the LECMs using its public key. The terminal card 55 supports functionality, such as checking XCA entitlements. It descrambles the content using the CWs of the LECMs, and then re-scrambles the content following the requirements of the XCA NRSS interface protection system. Block diagrams of an exemplary converter card 35 and terminal card 55 are illustrated in FIGS. 3 and 4, respectively. The storage unit 68 stores content in, and reads content from, non-volatile memory. It does not transform the type of the content unless provided with a converter card 45, in which case it also acts as an access device. A hard disk is a typical internal storage unit. Digital Versatile Disc (DVD) players and Digital Video Tape Recorders such as DVHSs are typical CE devices with removable storage. The presentation unit 64 decodes the MPEG2 content, and presents it to the user in an analog or decompressed digital form. It may descramble an NRSS stream using NRSS descrambler 64', decode a digital stream using MPEG decoder 64", and perform digital to analog conversion using digital to analog converter (DAC) 64'''. The final outcome may be a physical signal such as sound or an analog electrical signal. TV display and analog output of a hi-fi amplifier are typical examples. The switching unit 62 routes content within the device 60. Its function is limited to routing only; it does not transform the type of the content.

The XCA system is designed to protect the NRSS interface connecting an XCA terminal card 55 to a presentation device 50. NRSS interface protection is not required in access device 30 as the content is CA/XCA content.

The procedure for establishing an XCA protected NRSS interface involves: authenticating the presentation host device 50; establishing a shared secret key that is unique to a particular presentation device 50/terminal card 55 pair; creating shared keys for content protection; and scrambling content returning to the host 50 with Data Encryption Standard (DES) and the shared keys.

The Local Entitlement Control Message (LECM) may be contained in one or more sections which may be variable in length with the syntax of Table 1. The beginning of a section can be indicated by a pointer field in the packet payload.

TABLE 1

| Syntax | No. of Bits | Mnemonic |
| --- | --- | --- |
| Local_Entitlement)Control_Message{ | | |
|     Table_id | 8 | 0x80 or 0x81 |
|     Section_syntax_indicator | 1 | '1' |
|     Private_indicator | 1 | '1' |
|     Zero | 2 | '00' |
|     Private_section_length | 12 | Uimsbf |
|     Table_id_extension( ){ | | |
|         Reserved | 6 | '000000' |
|         LECM_type | 2 | '10' |
|         Protocol_version | 8 | Uimsbf |
|     } | | |
|     Reserved | 2 | '11' |
|     Version_number | 5 | '00000' |

TABLE 1-continued

| Syntax | No. of Bits | Mnemonic |
|---|---|---|
| Current_next_indicator | 1 | '1' |
| Section_number | 8 | 0x00 |
| Last_section_number | 8 | 0x00 |
| XCA_indentifier | 256 | Uimsbf |
| Local_source_id | 64 | Uimsbf |
| Reserved | 5 | Uimsbf |
| Copy_protect_enable | 1 | Uimsbf |
| XCA_view_flag | 2 | Uimsbf |
| Time_code | 32 | Uimsbf |
| Source_sequence_number | 32 | Uimsbf |
| XCA_descriptor | 424 | Uimsbf |
| Padding_bytes | 508 | Uimsbf |
| Integrity_check | 32 | Uimsbf |
| CRC_32 | 32 | Rpchof | where,

Table_id—This 8-bit field identifies the Entitlement Control Message that this section belongs to. It shall be set to either 0x80 or 0x81. When at least one bit changes in the LECM section, the table_id shall toggle.

Section_syntax_indicator—This 1-bit field shall be set to '1'. It denotes that the section follows the generic section syntax beyond section length field.

Private_indicator—This 1-bit field shall be set to '1'.

Private_section_length—This 12-bit field specifies the number of remaining bytes in this section, starting immediately following the private_section_length field, and including the CRC_32.

LECM_type—This 2-bit field indicates the type of information carried by the LECM. '10' means that it carries a Control Word.

Protocol_version—An 8-bit unsigned integer field whose function is to allow, in the future, this table to carry parameters that may be structured differently than those defined in the current protocol. At present, only one protocol is defined. When Protocol_version=0x00, only a single control word pair is used for the entire program, and similarly, the access criteria is defined for the entire program (i.e., no stream-level protection allowed). In this case, all streams of the event shall be scrambled with the same control word, and shall use the same access criteria. When Protocol_version=>0.01, values of protocol_version greater than 0x00 may only be processed by decoders designed to accommodate the later version of the protocol as they become deployed.

Version_number—This 5-bit field is reserved and shall have a value of '00000'. Future implementation can use this field if necessary.

Current_next_indicator—This 1-bit indicator is always set to '1' for a LECM; the LECM sent is always currently applicable.

Section_number—This 8-bit field contains the number of the private section. The section number of the first section in a private table shall be 0x00. The section number shall be incremented by 1 with each additional section belonging to this private table.

Last_section_number—This 8-bit field specifies the number of the last section of the private table of which this section is a part.

XCA_identifier—This 256-bit field contains a unique XCA identifier. The identifier has ASCII values of "Copyright: ©1999 TMM". Quotation marks are not included. Each ASCII character is assigned one byte of storage. Characters are left-justified in this field. Unassigned field values are set to 0x00.

Local_source_id—This 64-bit field contains the XCA device ID of the security device that generated this LECM.

Copy_protect_enable—This 1-bit field shall indicate the presence of a content protection mechanism for one or more streams of the program material that is delivered out of the presentation device. The purpose of this flag is to provide a means to detect fault indication for the user and shall not be used to enforce copy protection. The value of this field is set to '1' if the protection for at least one stream is enabled.

XCA_view_flag—The value of this 2-bit field shall be determined by the authority that manages protection of the program content prior to conversion to XCA protection. This value shall be compared with the value of the XCA_view_flag in the XCA_descriptor. In case of a discrepancy, the protected XCA_view_flag shall be used to enforce viewing rights within the security processor of an XCA Presentation Device. The semantic shall be as follows:

XCA_view_flag='00': XCA content is not restricted. View anywhere, any time. XCA_view_flag='01': XCA reserved. XCA_view_flag='10': XCA content is restricted to viewing any time within the local network. XCA_view_flag='11': XCA content is restricted to viewing "now" within the local network.

Time_code—If the time source is known and secure, this field contains the number of seconds that has transpired since 12 am Jan. 6, 1980 UTC (mod $2^{32}$). If the time source is not known and secure, this field shall be coded as all 0's.

Source_sequence_number—This 32-bit field contains the current value of the cryptoperiod counter of the converter module that created the LECM.

Padding_bytes—The number of bytes needed to make the total length of the secure part of the LECM 128 bytes (128-65). The padding_bytes are randomly chosen.

Integritycheck—This 32-bit number field contains a value that verifies that the content of the decrypted payload is valid. It is used to ensure the encryption and decryption processes are performed properly.

CRC-32—This 32-bit field contains the CRC value that ensures a zero output from the registers in the decoder defined in Annex A of ISO/IEC 13818-1 "MPEG2Systems" after processing the entire LECM section. This value shall be calculated after the data have been encrypted.

Each converter card 35 supports a transformation from CA protected content to XCA protected content and has a 32-bit cryptoperiod counter. A cryptoperiod is defined as the period during which a stream or a program is scrambled with one particular key. For each new cryptoperiod, i.e., control word change, the converter module shall increment its cryptoperiod counter by 1. If, for example, a program includes three streams with different cryptoperiods, the counter is incremented at the beginning of each cryptoperiod for each stream. Protected against external access, this counter cannot be reset or decreased. The initial value of the cryptoperiod counter is 0.

Once the converter card 35 determines that the access to the content is legitimate, it uses the following information to build the LECM: odd and even CWs; Copy Control Information (CCI); and Copy Protection (CP) status, e.g., one of the three possible states "view freely", "view locally", or "view now".

The transformation from CA protected content to XCA protected content includes the following processes: the converter card 35 assigns its XCA_ID to local_source_id; the converter card 35 sets copy_protect_enable to 1 if the content is of type "view now", otherwise copy_protect_enable is set to 0; the converter card 35 assigns the current value of the cryptoperiod counter to source_sequence_number; and, the converter card assigns a hash value computed on the secure-part of the LECM to integrity_check.

The hash method is as follows according to an aspect of the present invention:

$$C[0]=M[0] \oplus M[4] \oplus \ldots \oplus M[4 \times (n/4)]$$

$$C[1]=M[1] \oplus M[5] \oplus \ldots \oplus M[4 \times ((n-1)/4)+1]$$

$$C[2]=M[2] \oplus M[6] \oplus \ldots \oplus M[4 \times ((n-2)/4)+2]$$

$$C[3]=M[3] \oplus M[7] \oplus \ldots \oplus M[4 \times ((n-3)/4)+3]$$

where, $M[i]$ represents the $i^{th}$ byte of the message to encrypt, the first byte of the sequence has index 0; and, $C[i]$ represents the $i^{th}$ byte of the integrity_check field, the first byte of the field has index 0.

The secure part of the LECM is encrypted using RSA-1024. The encryption key is the free viewing public key $K_{pub\_free}$, if the content is of "free viewing" type, otherwise it is the converter card's public key $K_{pub\_i}$. Finally, the converter card calculates CRC_32 after encrypting the secure part of LECM.

Referring again to FIG. 3, therein is illustrated a block diagram of an exemplary converter card 35. Converter card 35 includes a CA system 100 and an XCA system 200. The CA system 100 generally includes: an ISO-7816 link device 110 communicable with the host device, e.g. access device 30, via the link 37; CA operational Software (SW) 120; ECM and EMM extractors 130, 140; and Triple Date Encryption Standard (TDES) device 150. An input 155 for receiving CA content from the host is provided and supplied to TDES device 150, and ECM and EMM extractors 130, 140. The TDES device 150 further includes an output 160. The XCA system 200 generally includes XCA operational software 220 and ECM replacement module 230. The ECM replacement module 230 is communicable with the TDES conversion module 150 via the output 160. The ECM replacement module 230 is further provided with an output 235 for returning XCA content to the host.

Terminal card 55 supports a transformation of XCA protected content to NRSS content. For this purpose, the terminal card 55 holds a record for each converter card 35(*i*) linked to it. This record contains the following fields: the XCA_ID of the converter card 35(*i*); the private key $K_{priv\_i}$ of the converter card 35(*i*); and, the most recent value of the source_sequence_number $SSN_i$ received from the converter card 35(*i*). The transformation of XCA protected content to NRSS content includes: if the value of CRC_32 does not match with the value computed from LECM, then the terminal card 55 cancels the transformation. If the status of the content defined by XCA_view_flag corresponds to "free viewing" type, then the decryption key is the free viewing private key $K_{priv\_free}$. The terminal card 55 decrypts the secure part of LECM using RSA-1024. From the unencrypted local_source_id, the terminal card 55 identifies the issuing converter card 35. If the terminal card 55 does not yet have the corresponding private key, i.e., if the terminal card 55 does not have a record whose first field is equal to the value of local_source_id, then it stops the transformation, and initiates a request for the private key. Otherwise, the terminal card 55 decrypts the secure part of LECM with RSA-1024 using the private key associated with the converter card 35 identified by local_source_id. If the value of XCA_view_flag in the unencrypted part does not match with the value of XCA_view_flag in the XCA descriptor, then the terminal card 55 cancels the transformation. If the content corresponds to the "view now" type, then the terminal card 55 ensures that there is no replay using two checks. If a secure time source is not available for the host, then the first check is omitted. In the first check, the terminal card 55 compares time code with the host time received from the presentation device 50 using an NRSS command. If the difference is not more than a predetermined amount, e.g. five minutes, then the terminal card 55 compares $SSN_i$ with source_sequence_number. Otherwise, it cancels the transformation. In the second check, if $SSN_i$ is less than source_sequence_number, then the terminal card 55 updates the corresponding $SSN_i$, and descrambles the content using the CWs in the LECMs. Otherwise, it cancels the transformation. If the content does not correspond to the "view now" type, then the terminal card 55 descrambles the content using the CWs in the LECMs. The terminal card 55 passes the contents of the CCI field to the NRSS module 300 for NRSS protection purposes. Finally, the terminal card 55 informs the NRSS module 300 of each new cryptoperiod occurrence.

In another transformation, XCA protected content is transformed to clear content. This transformation is similar to transforming XCA protected content to NRSS content, where noteworthy differences are: that the clear content is directly passed to the switching unit 62 of a device 60 for example; and, that the CCI is directly passed to the host processor.

Referring again to FIG. 4, therein is illustrated a block diagram of an exemplary terminal card 50. Generally, the terminal card 50 includes a CA system 400, and an XCA system 300. The CA system 400 generally includes: an ISO-7816 link device 410 communicable with the host device, e.g. presentation device 50, via the link 57; CA operational software (SW) 420; ECM and EMM extractors 430, 440; and Triple Date Encryption Standard (TDES) descrambling device 450. Input 455 for receiving CA/XCA content from the host is provided and supplied to TDES device 450, and ECM and EMM extractors 430, 440. The TDES device 450 further includes an output 460. The XCA system 300 generally includes XCA operational software 320; NRSS copy protection operational software (SW) 340; and NRSS copy protection (CP) module 350. The NRSS copy protection (CP) module 350 is communicable with the TDES descrambling module 450 via the output 460. The NRSS copy protection (CP) module 350 is further provided with an output 435 for returning NRSS content to the host.

Terminal cards 55 exchange data with the host device 50 to complete their tasks. This communication can be effected using NRSS EIA-679B compliant commands, for example. In accordance with the applicable NRSS specification, the host monitors the card status periodically to determine what operations need to be performed.

The National Renewable Security Standard (NRSS) provides a means for renewable security to be employed with digital Consumer Electronics (CE) devices such as DTV receivers and digital VCRs. The security functionality is thus separated from navigational devices. When an NRSS security device, such as terminal card 55, receives protected content from its host device, such as presentation device 50, it descrambles it and sends it back to the host device. As the content is in-the-clear before it leaves the security device, it needs to be protected across the interface. The NRSS standard also defines a framework for encryption-based copy protection systems.

According to the NRSS specification, hosts and terminal cards may be manufactured with support for one or more NRSS copy protection systems. These systems are identified by unique Copy Protection (CP) system IDs. A negotiation can be used between a terminal card 55 and its host device 50 to determine which systems are implemented. As part of the terminal card 55 initialization, the host 50 informs the terminal card 55 about the NRSS copy protection systems it supports. If an XCA NRSS copy protection system is included in this set, the terminal card 55 sends back the CP system ID with its configuration which also includes the CA system ID. Looking at this configuration, the host 50 realizes that both XCA and a particular CA system are supported by the terminal card 55, and subsequently parses the PMT using both the XCA system ID and CA system ID. For each new program, the card 55 obtains service and ECM PIDs from the host. According to an aspect of the invention, the XCA CA system ID is stored in host devices supporting the XCA copy protection system as it is not a confidential piece of data, and does not require secure storage.

By construction, the terminal card 55 processes both CA and XCA streams coming from various sources including broadcaster head-end and playback devices in the home network. Depending on the content received, the host e.g. presentation device 50, may send either one or two pairs of {Service PID, ECM PID} to the terminal card 55. Three possibilities may exist: (1) Only one pair is sent; {Service PID, ECM PID} which contains the LECM PID; (2) Only one pair is sent; {Service PID), ECM PID} which contains the CA ECM PID; or, (3) Two pairs are sent; where one pair contains the LECM, the other the CA ECM PID. Hence, there is a need to differentiate between CA ECMs and LECMs. Two exemplary cases are provided.

Case (a): Where two pairs are provided—The first {Service PID, ECM PID} pair is defined to be a predetermined one of the PIDs, e.g. the LECM PID or CA ECM PID by convention.

Case (b): Where only one pair is received—The terminal card detects LECMs by checking their syntax, such as was discussed in relation with Table 1. According to another aspect of the invention, two fields that may be used for this purpose are LECM_type and XCA_identifier. The former indicates what the transport packet carries, while the latter provides a unique identification for the XCA LECM.

For example, consider a program with the following service PIDs: (1) Video PID: 100, and (2) Audio PID: 101. These two elementary streams are protected with the same key. The descrambling keys are carried in ECMs protected by two CA systems (there may be more than two CA systems): (1) CA system #1 ECM PID: 180, and (2) CA system #2 ECM PID: 181. Assume the ECM for CA system #1 is converted to and replaced by, an LECM with PID 182. Now, the host device will send two sets of (service PID, ECM PID) pairs to the card as is characterized by Table 2.

TABLE 2

| Service PID | ECMPID |
|---|---|
| 100 | 182 |
| 101 | 182 |
| 100 | 181 |
| 101 | 181 |

The PID 182 will be identified to be the PID for LECMs where the first of the pairs was set to be the LECM PIC by convention.

The invention claimed is:

1. A method for enabling a security device to access a service, the method comprising:
receiving a datastream including said service and ancillary data associated with said service;
extracting at least two service and entitlement control message packet identifier pairs associated with said service from said datastream, each said packet identifier pair including a service identifier and an entitlement control message packet identifier associated with said service; and
automatically identifying one of the extracted pairs according to a predefined convention,
wherein said entitlement control message packet identifier comprises one of a conditional access entitlement control message identifier and a local entitlement control message identifier.

2. The method according to claim 1, wherein the predefined convention is dependent upon an order in which the pairs are sent to the security device.

3. The method of claim 1, wherein each of the received pairs is either associated with a conditional access system or extended conditional access system.

4. A method for enabling a security device to access a service, the method comprising:
receiving a datastream including said service and ancillary data associated with said service;
extracting service and entitlement control message packet identifier pairs associated with said service from said datastream, each said packet identifier pair including a service identifier and an entitlement control message packet identifier associated with said service; and,
if only one service and entitlement control message packet identifier pair associated with the service is extracted, identifying the extracted pair based on type information associated with the extracted packet identifier pair; and,
if more than one service and entitlement control message packet identifier pair associated with the service are extracted, automatically identifying at least one of the extracted pairs according to a predefined convention,
wherein a first one of the received pairs includes a conditional access entitlement control message identifier and a second one of the received pairs includes a local entitlement control message identifier.

5. The method of claim 4, wherein the predefined convention is dependent upon an order in which the pairs are sent to the security device.

6. The method of claim 4, wherein each of the received pairs further includes a service identifier.

7. The method of claim 4, wherein the predefined convention defines a first of the pairs to be received to include the service identifier and local entitlement control message identifier.

8. The method of claim 4, wherein at least a portion of the data is secured using one of a plurality of conditional access systems.

9. The method of claim 8, wherein at least one of the conditional access systems is associated with a broadcaster of the program and at least a second of the conditional access systems is associated with an access device, communicable with the presentation device.

10. The method of claim 9, wherein the presentation device is a digital television, and the access device is a set-top box in combination with a second security device.

11. The method according to claim 8, wherein at least one portion of the data is indicative of at least one program.

12. The method of claim 4, further comprising:
the security device communicating interface protection related information and conditional access related information to the audio/video processing device; and,
the audio/video processing device parsing a program map table using the communicated conditional access information and stored conditional access information;
wherein the program map table associates packet identifiers with corresponding service information.

13. The method of claim 12, wherein the security device uses packet identifiers to identify which of the packets contains entitlement control message data suitable for descrambling the data indicative of the program.

14. The method of claim 13, wherein at least some of said entitlement control messages are local entitlement control messages which include at least a field for identifying said local entitlement control message and a field for conditional access identification, and descrambling said service by accessing an appropriate key in said data using information included in at least one of said field for identifying said local entitlement control message and said field for conditional access identification.

15. The method according to claim 4, wherein the data is communicated via a digital transmission system.

16. A method for identifying local entitlement control messages comprising the step of:
receiving a datastream including a service and ancillary data associated with said service;
extracting service and entitlement control message packet identifier pairs associated with said service from said datastream, each said packet identifier pair including a service identifier and an entitlement control message packet identifier associated with said service; and,
if only one service and entitlement control message packet identifier pair associated with the service is extracted, identifying the extracted pair as including either a local entitlement control message or a broadcast entitlement control message based on type information associated with the extracted packet identifier pair; and,
if more than one service and entitlement control message packet identifier pair associated with the service are extracted, automatically identifying at least one of the extracted pairs as including said local entitlement control message according to a predefined convention.

17. A method for identifying local entitlement control messages comprising the step of:
extracting service and entitlement control message packet identifier pairs from data associated with a service; and,
if only one service and entitlement control message packet identifier pair associated with the service is extracted, identifying the extracted pair as including either a local entitlement control message or a broadcast entitlement control message based on type information associated with the extracted packet identifier pair; and,
if more than one service and entitlement control message packet identifier pair associated with the service are extracted, automatically identifying at least one of the extracted pairs as including a broadcast entitlement control message according to a predefined convention.

18. A method, comprising:
receiving a datastream including a service;
identifying, in the datastream, at least two service and entitlement control message packet identifier pairs associated with said service, wherein one of the received pairs includes a conditional access entitlement control message identifier and a second one of the received pairs includes a local entitlement control message identifier;
determining whether a particular one of the identified service and entitlement control message packet identifier pairs is associated with one of a conditional access entitlement control message of a service provider and a local entitlement control message of a local network based on a predefined convention related to an ordering of the service and entitlement control message packet identifier pairs within the datastream;
acquiring data packets associated with the service and entitlement control messages in response to the packet identifier pairs;
determining a decryption key in response to the acquired data packets;
decrypting the data packets having service data in response to the decryption key.

19. The method according to claim 18, wherein the local entitlement control message includes a rebundled scrambling key that is based on the scrambling key associated with the conditional access entitlement control message.

* * * * *